United States Patent [19]
Kodama et al.

[11] Patent Number: 5,925,826
[45] Date of Patent: Jul. 20, 1999

[54] INTEGRATED PRESSURE SENSOR UNIT AND SOLENOID VALVE UNIT

[75] Inventors: Seiki Kodama; Akira Koshimizu; Akira Sakata, all of Tokyo, Japan

[73] Assignee: Mitsubishi Denki Kabushiki Kaisha, Tokyo, Japan

[21] Appl. No.: 08/968,567

[22] Filed: Nov. 12, 1997

[30] Foreign Application Priority Data

Jul. 23, 1997 [JP] Japan ................................. 9-197242

[51] Int. Cl.⁶ .............................. G01L 9/04; G01L 19/06
[52] U.S. Cl. ................................. 73/726; 73/756
[58] Field of Search ............................ 73/700, 715, 717, 73/723, 756, 754, 753, 726, 727, 719

[56] References Cited

U.S. PATENT DOCUMENTS

| | | | |
|---|---|---|---|
| 4,644,116 | 2/1987 | Miyakawa | 73/723 |
| 5,747,694 | 5/1998 | Baba et al. | 73/723 |

FOREIGN PATENT DOCUMENTS

| | | | |
|---|---|---|---|
| WO 094015189 | 7/1994 | European Pat. Off. | 73/754 |
| 63-228038 | 9/1988 | Japan | 73/754 |
| 2-157632 | 6/1990 | Japan | 73/754 |
| 2-280026 | 11/1990 | Japan | 73/754 |
| 60281518 | 10/1994 | Japan | 73/700 |
| 7-151626 | 6/1995 | Japan . | |

*Primary Examiner*—Richard Chilcot
*Assistant Examiner*—Abdullahi Aw-Musse
*Attorney, Agent, or Firm*—Sughrue, Mion, Zinn, Macpeak & Seas, PLLC

[57] ABSTRACT

A compact pressure detecting apparatus comprising a pressure sensor unit, having a semiconductor pressure-detecting device provided with gauge resistance, integrated with a solenoid valve unit for controlling a channel of a measurement fluid into the body of the apparatus. The semiconductor pressure-detecting device partitioned a sensor vessel into a reference pressure chamber and a measurement fluid introduction chamber the measurement fluid introduction chamber can communicate with an environment outside of the pressure sensor unit the pressure-detecting device has a base with a through-hole, on which an electronic circuit and the pressure sensor are mounted. The pressure detecting apparatus also includes a solenoid valve unit; a port portion having a plunger storing portion with an opening at one end, a first intake channel for communicating the plunger storing portion with an environment outside of the solenoid valve unit which introduces a first measurement fluid, a second intake channel for communicating the plunger storing portion with an environment outside of the solenoid valve unit which introduces a second measurement fluid, and a discharge channel for communicating the plunger storing portion with the measurement fluid introduction chamber. The pressure sensor unit and the solenoid unit are integrated into one body by joining the base with the port portion so that the through-hole of the base communicates with the discharge channel of the port portion.

20 Claims, 6 Drawing Sheets

INTEGRATED PRESSURE SENSOR UNIT AND SOLENOID VALVE UNIT

BACKGROUND OF THE INVENTION

1. Field of the Invention

The present invention relates to a pressure detecting apparatus constituted by integrating a pressure sensor having a built-in semiconductor pressure-detecting device provided with a gauge resistance and a solenoid valve for controlling a channel of a measurement fluid into one body.

2. Description of the Related Art

FIG. 6 is a block diagram showing a conventional pressure detecting apparatus.

In FIG. 6, a pressure sensor 100 is set so that a semiconductor pressure-detecting device partitions the inside of a sensor vessel 101 into a reference pressure chamber and a measurement fluid introduction chamber. Moreover, a nipple 102 for introducing a measurement fluid into the measurement fluid introduction chamber is provided for the sensor vessel 101.

The pressure sensor 100 is set to a bracket 106 together with a solenoid valve 103. Moreover, the nipple 102 and an outlet 105 of the solenoid valve 103 are connected each other by a hose 107.

The conventional pressure detecting apparatus thus constituted is set to, for example, the chassis in an engine room and used by connecting a hose from an engine intake pipe to an inlet 104 of the solenoid valve 103.

Moreover, intake air introduced from the engine intake pipe through the hose is introduced into the measurement fluid introduction chamber through the inlet 104, outlet 105, hose 107, and nipple 102 when the solenoid valve 103 opens. Therefore, in the pressure sensor 100, the semiconductor pressure-detecting device is distorted due to the differential pressure between the reference pressure chamber and the measurement fluid introduction chamber and the pressure of the intake air is detected.

As described above, the conventional pressure detecting apparatus requires the bracket 106 and the hose 107 in order to integrate the pressure sensor 100 and the solenoid valve 103 into one body because the pressure sensor 100 and the solenoid valve 103 are separate products. Thus, problems occur that a unit is increased in size and a large setting space is necessary.

Moreover, because the pressure sensor 100 and the solenoid valve 103 are respectively provided with a connector for electrical connection, problems occur that two pairs of connectors are also necessary for the chassis harness side and the connecting operation becomes troublesome.

SUMMARY OF THE INVENTION

The present invention is made to solve the above problems and its object is to provide a compact pressure-detecting apparatus constituted by compounding and integrating a pressure sensor and a solenoid valve into one body.

In order to achieve the above object, according to one aspect of the present invention, there is provided a pressure detecting apparatus comprising: a pressure sensor unit including a pressure sensor in which a semiconductor pressure-detecting device is set so as to partition a sensor vessel into a reference pressure chamber and a measurement fluid introduction chamber and moreover in which a nipple is set so as to communicate the measurement fluid introduction chamber with a discharge of a port portion, wherein the semiconductor pressure-detecting device has a diaphragm portion formed by decreasing a part of a substrate thereof in thickness and a bridge circuit constituted by forming gauge resistances around the diaphragm portion; a circuit board on which an electronic circuit for amplifying and correcting an electrical signal of the semiconductor pressure-detecting device and the pressure sensor are mounted; a base made of resin which has a through-hole, on which the circuit board is mounted, and in which the nipple is provided with an O ring and press-fitted into the through-hole; and a cap made of resin in which a pressure-sensor-side terminal is insert-molded and a pressure-sensor storing portion is formed and which is set to the base so as to store the pressure sensor in the pressure sensor storing portion; and a solenoid valve unit including a coil body in which a coil wound on a bobbin and a solenoid-valve-side terminal electrically connected to the coil are insert-molded in a case made of resin and a core inserting hole is formed at the axis center of the coil; a port portion made of resin in which a plunger storing portion with an opening at one end, a first intake channel for communicating the plunger storing portion with an environment outside of the intake channel which introduces a first measurement fluid, and a discharge channel for communicating the plunger storing portion with another environment outside of the solenoid valve, namely the measurement chamber of the sensor unit are provided and which is connected to the coil body so that the opening of the plunger storing portion faces the the core inserting hole; a core which is inserted into the core inserting hole of the coil body and in which a second intake channel for introducing second measurement fluid is provided for the axis center of the core so as to communicate the plunger storing portion with an environment external to the second intake channel; a plunger which is stored in the plunger storing portion and reciprocated in the plunger storing portion due to the magnetic attraction of the coil; and a valve element set to the plunger to block either of the first intake channel and the second intake channel in accordance with the reciprocation of the plunger; wherein the pressure sensor unit and the solenoid unit are integrated into one body by joining the base with the port portion so that the through-hole of the base communicates with the discharge channel of the port portion.

According to another aspect of the invention, there is provided a pressure detecting apparatus comprising: a pressure sensor unit including a pressure sensor in which a semiconductor pressure-detecting device is set so as to partition a sensor vessel into a reference pressure chamber and a measurement fluid introduction chamber and moreover in which a nipple is set so as to communicate the measurement fluid introduction chamber with another environment outside of the pressure sensor unit, namely the port portion discharge channel, wherein the semiconductor pressure-detecting device has a diaphragm portion formed by decreasing a part of a substrate thereof in thickness and a bridge circuit constituted by forming gauge resistances around the diaphragm portion; a circuit board on which an electronic circuit for amplifying and correcting an electrical signal of the semiconductor pressure-detecting device and the pressure sensor are mounted; and a cap made of resin in which a pressure-sensor-side terminal is insert-molded and a pressure-sensor storing portion is formed and which the pressure sensor is stored in the pressure sensor storing portion; and a solenoid valve unit including a resin mold in which a core inserting hole is formed from one side, a plunger storing portion is provided for the bottom of the core inserting hole, a first intake channel for introducing first measurement fluid is provided from the other side so as to communicate the plunger storing portion with an environment outside of the first intake channel, a discharge channel is provided so as to communicate the plunger storing portion with the pressure sensor unit measurement chamber, and a coil winding frame is coaxially provided for the outer boundary of the coil inserting hole; a coil wound on the coil winding frame; a solenoid-valve-side terminal electrically connected to the coil, a core which is inserted into the core inserting hole of the resin mold and in which a second intake channel for introducing second measurement fluid is provided at the axis center so as to communicate the plunger storing portion with an environment outside of the second intake channel; a plunger which is stored in the plunger storing portion and reciprocated in the plunger storing portion due to the magnetic attraction of the coil; a valve element set to the plunger to block either of the first intake channel and the second intake channel in accordance with the reciprocation of the plunger; and a case made of resin in which the resin mold, the coil, the solenoid-valve-side terminal, and the core are insert-molded and an engaging portion is provided for the entire upside margin; wherein the nipple is provided with an O ring and press-fitted into the discharge channel, the cap is engaged with the engaging portion of the case, the cap is joined with the engaging portion of the case, and the pressure sensor unit and the solenoid valve unit are integrated into one body.

DETAILED DESCRIPTION OF THE PREFERRED EMBODIMENTS

The preferred embodiments of the present invention are described below by referring to the accompanying drawings.

Embodiment 1

Figure 1:
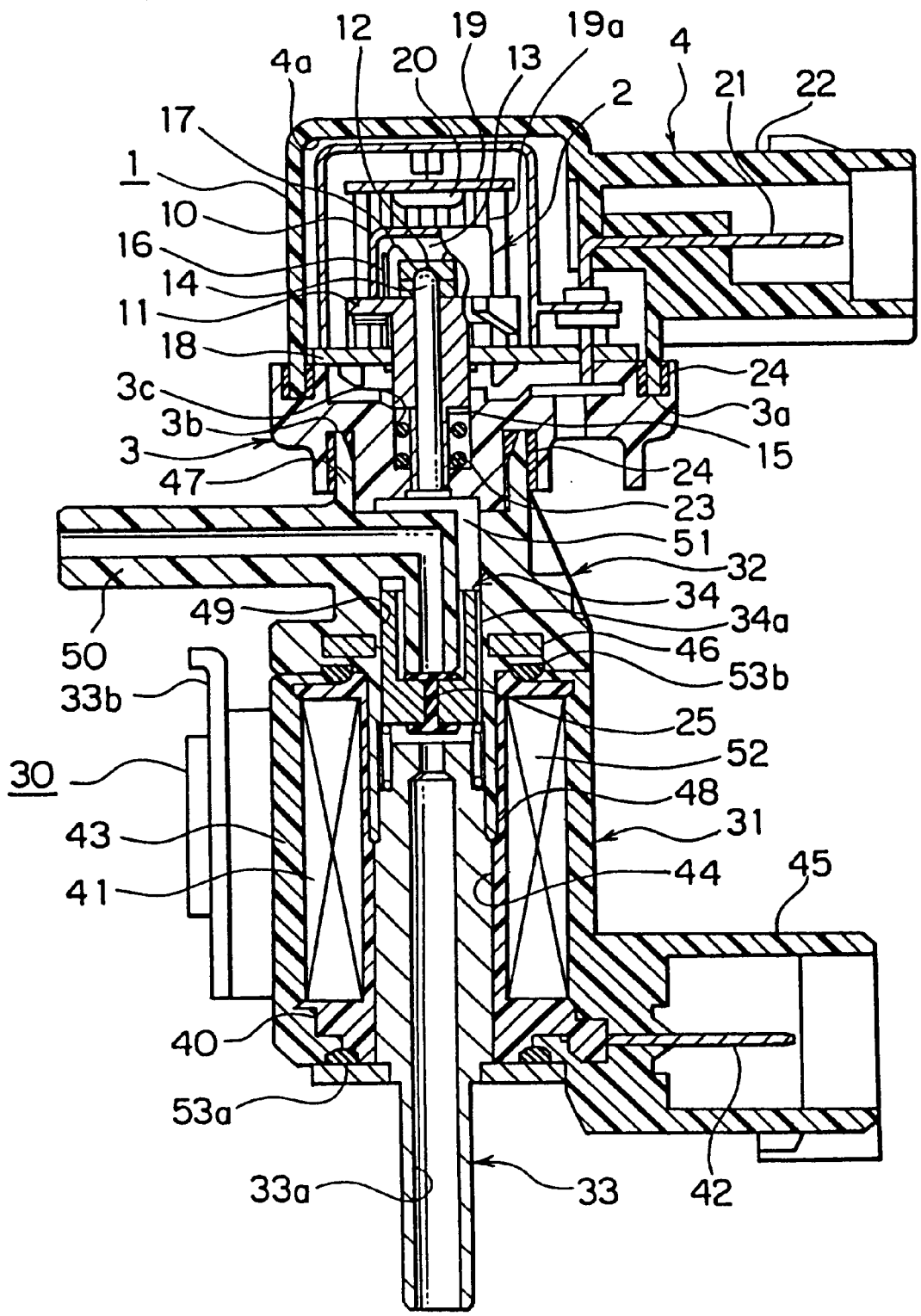
FIG. 1 is a sectional view showing the pressure detecting apparatus of embodiment 1 of the present invention.

FIG. 1 is a sectional view showing the pressure detecting apparatus of the embodiment 1 of the present invention.

In FIG. 1, a pressure sensor unit 1 is constituted by storing a pressure sensor 2 in a closed space formed by a base 3 and a cap 4.

The pressure sensor 2 is constituted by securing a sensor vessel 10 on a pedestal 11 and setting a semiconductor pressure-detecting device 12 so as to be partitioned the sensor vessel 10 into a reference pressure chamber 13 and a measurement fluid introduction chamber 14. Moreover, a nipple 15 for communicating the measurement fluid introduction chamber 14 with the outside is provided for the pedestal 11. In the case of the semiconductor pressure-detecting device 12, a diaphragm portion is formed by decreasing a part of a silicon substrate in thickness and gauge resistances are formed on the diaphragm portion thereof so as to constitute a bridge circuit. Moreover, electrode terminals 16 are provided by passing through the pedestal 11 and each electrode of the semiconductor pressure-detecting device 12 is connected to one end of each electrode terminal 16 through a wire 17.

The pressure sensor 2 is mounted by soldering an end of each electrode terminal 16 protruded from the pedestal 11 to the circuit board 18. A ceramic circuit board 19 having a U-shaped cross section is set to the circuit board 18 so as to cover the pressure sensor 2. An amplifying circuit body 20 serving as an electronic circuit for amplifying an output signal of the pressure sensor 2 is set inside of the sensor circuit board 19.

Moreover, the pressure sensor 2 is electrically connected with the amplifying circuit body 20 by wiring 19a provided on the ceramic circuit board 19 and printed wiring (not illustrated) provided on the circuit board 18.

The base 3 is made of resin, in which a fitting groove 3a is provided for the margin of one side, a fitting groove 3b is provided for the entire margin of the other side, and a through-hole 3c is provided for the central portion. The cap 4 is made by injecting resin into a die in which a terminal 21 is set and injection-molding the resin and provided with a pressure sensor storing portion 4a and a connector portion 22.

Moreover, the circuit board 18 with the pressure sensor 2 and the ceramic circuit board 19 mounted on it is built in one side of the base 3 while press-fitting the nipple 15 with an O ring 23 mounted on it into the through-hole 3c. Furthermore, the cap 4 is put so as to store the pressure sensor 2 in the storing portion 4a of the cap 4 to fit the margin of the cap 4 into the fitting groove 3a. Thereafter, an adhesive 24 is injected into the fitting groove 3a and cured and thus, the pressure sensor unit 1 is assembled. The airtightness of the pressure sensor unit 1 is secured by the O ring 23 and the adhesive 24.

A solenoid valve unit 30 comprises a coil body 31, a port portion 32, a core 33, and a plunger 34.

The coil body 31 is constituted by insert-molding a bobbin 40, a coil 41 wound on the bobbin 40, and a terminal 42 electrically connected to the coil 41 in a case 43. That is, the coil body 31 is injection-molded by setting an assembly constituted by winding the coil 41 on the bobbin 40 and electrically connecting the terminal 42 to the coil 41 in a die and injecting resin into the die. Moreover, in the coil body 31, a core inserting hole 44 is formed at the axis center of the coil 41 and a connector 45 is provided for the side.

The port portion 32 is constituted by insert-molding an iron ring 46 therein. Moreover, though not illustrated, a part of the ring 46 is protruded from one side of the port portion 32. A fitting protrusion 47 to be fitted to the fitting groove 3b of the base 3 is protruded to one side of the port portion 32 and a cylindrical fitting protrusion 48 to be fitted to the core inserting hole 44 is protruded to the other side of the portion 32. Moreover, a plunger storing portion 49 with a circular cross section for storing the plunger 34 is provided for the center of the fitting protrusion 48. Furthermore, a first intake channel 50 for taking in the first measurement fluid is provided so as to face the plunger storing portion 49 from the side wall and a discharge channel 51 for discharging the taken-in measurement fluid is provided so as to face the plunger storing portion 49 from the one side wall.

The core 33 is made of cylindrically formed iron and its central hole 33a functions as a second intake channel for introducing the second measurement fluid.

Moreover, the core 33 has an extended portion 33b which a part of the core 33 is extended to the side.

The plunger 34 is formed into a bottomed cylindrical shape with a diameter almost equal to the inside diameter of the plunger storing portion 49 and a groove 34a is formed on the outer boundary along the axis center. Moreover, a rubber valve 25 is set at the center of the bottom of the plunger 34 so as to protrude toward the inner boundary and the outer boundary.

Furthermore, the core 33 is fitted into the core inserting hole 44 of the coil body 31 from one end of the coil body 31 and an O ring 53a is set between the core 33 and the coil body 31. Furthermore, a spring 52 is inserted into the core inserting hole 44 on the other end of the core body 31. Then, the port portion 32 storing the plunger 34 in the plunger storing portion 49 is brought into contact with the coil body 31 by inserting the fitting protrusion 48 of the portion 32 into the core inserting hole 44. In this case, an O ring 53b is set between the coil body 31 and the port portion 32. Then, the protruded portion of the ring 46 is caulked and secured to the extended portion 33b of the core 33 and thus, the solenoid valve unit 30 is assembled. The airtightness of the solenoid valve unit 30 is secured by the O rings 53a and 53b compressed by the caulking force of the protruded portion of the ring 46.

The pressure sensor unit 1 and the solenoid valve unit 30 thus assembled are integrated into one body by fitting the fitting protrusion 47 of the port portion 32 to the fitting groove 3b of the base 3 and injecting the adhesive 24 into the fitting groove 3b and curing the adhesive 24 and thereby, a pressure detecting apparatus is obtained. In the case of this pressure detecting apparatus, the pressure sensor unit 1 and the solenoid valve unit 30 are connected by the adhesive 24 in an airtight manner and the discharge channel 51 of the port portion 32 is connected to the nipple 15 of the pressure sensor 2. Moreover, the core 33 and the ring 46 constitute a magnetic circuit.

Then, operations of the pressure detecting apparatus are described below.

When the coil 41 is turned on through the terminal 42 and magnetized, magnetic attraction is generated. The magnetic attraction works on the plunger 34 and thereby, the plunger 34 moves downward in FIG. 1 against the pressure of the spring 52 by using the plunger storing portion 49 as a guide. Moreover, the plunger 34 contacts the core 33 and a valve element 25 blocks the central hole 33a of the core 33. Then, the first measurement fluid incoming through the intake channel 50 is introduced into the measurement fluid introduction chamber 14 through the discharge channel 51 and the nipple 15. The diaphragm portion of the semiconductor pressure-detecting device 12 is distorted due to the differential pressure between the reference pressure chamber 13 and the measurement fluid introduction chamber 14. Then, the bridge circuit converts the distortion of the diaphragm portion into an electrical change. The output of the pressure sensor 2 is input to the amplifying circuit body 20 through the wire 17, electrode terminal 16, and circuit board 18, amplified by the amplifying circuit body 20, and then output to an external unit through the circuit board 18 and terminal 21. Thus, the pressure of the first measurement fluid introduced through the intake channel 50 is detected.

Moreover, when the coil 41 is turned off, it is brought into an unmagnetized state. Furthermore, the magnetic attraction of the coil 41 disappears. Therefore, the plunger 34 is moved upward in FIG. 1 due to the pressure of the spring 52 by using the plunger storing portion 49 as a guide. Then, the valve element 25 of the plunger 34 blocks the intake channel 50. Thus, the second measurement fluid incoming through the central hole 33a is introduced into the measurement fluid introduction chamber 14 through the groove 34a, the discharge channel 51, and nipple 15. Thus, the pressure of the second measurement fluid introduced through the central hole 33a is detected.

In the case of this embodiment 1, because the port portion 32 of the solenoid valve unit 30 is directly joined to the base 3 of the pressure sensor unit 1 by the adhesive 24, a bracket and a hose used for a conventional apparatus are unnecessary, downsizing is realized, and the setting space is decreased. Moreover, because the base 3 and the port portion 32 are both made of resin, resins are joined each other and therefore, a large joining strength is obtained and a high-enough airtightness is secured.

Furthermore, because the fitting groove 3b is annularly provided for the base 3, the fitting protrusion 47 is annularly provided for the port portion 32 and fitted to the fitting groove 3b and thereafter, both are joined to each other by the adhesive 24, positioning becomes easier and the assembling characteristic is improved. Furthermore, the fitting groove 3b prevents the adhesive 24 from leaking and the discharge channel 51 is not blocked by the adhesive 24.

Furthermore, because the hole center of the central hole 33a of the core 33 and that of the nipple 15 are aligned, the second measurement fluid incoming through the central hole 33a is almost linearly introduced into the measurement fluid introduction chamber 14. Therefore, the loss of the introduction pressure is reduced and the responding characteristic is improved. Furthermore, the distance between the pressure sensor 2 and the coil 41 is increased, the temperature rise of the pressure sensor 2 due to the heat produced by the coil 41 is prevented, and the operation stability of the pressure sensor 2 is improved.

Embodiment 2

Figure 2:
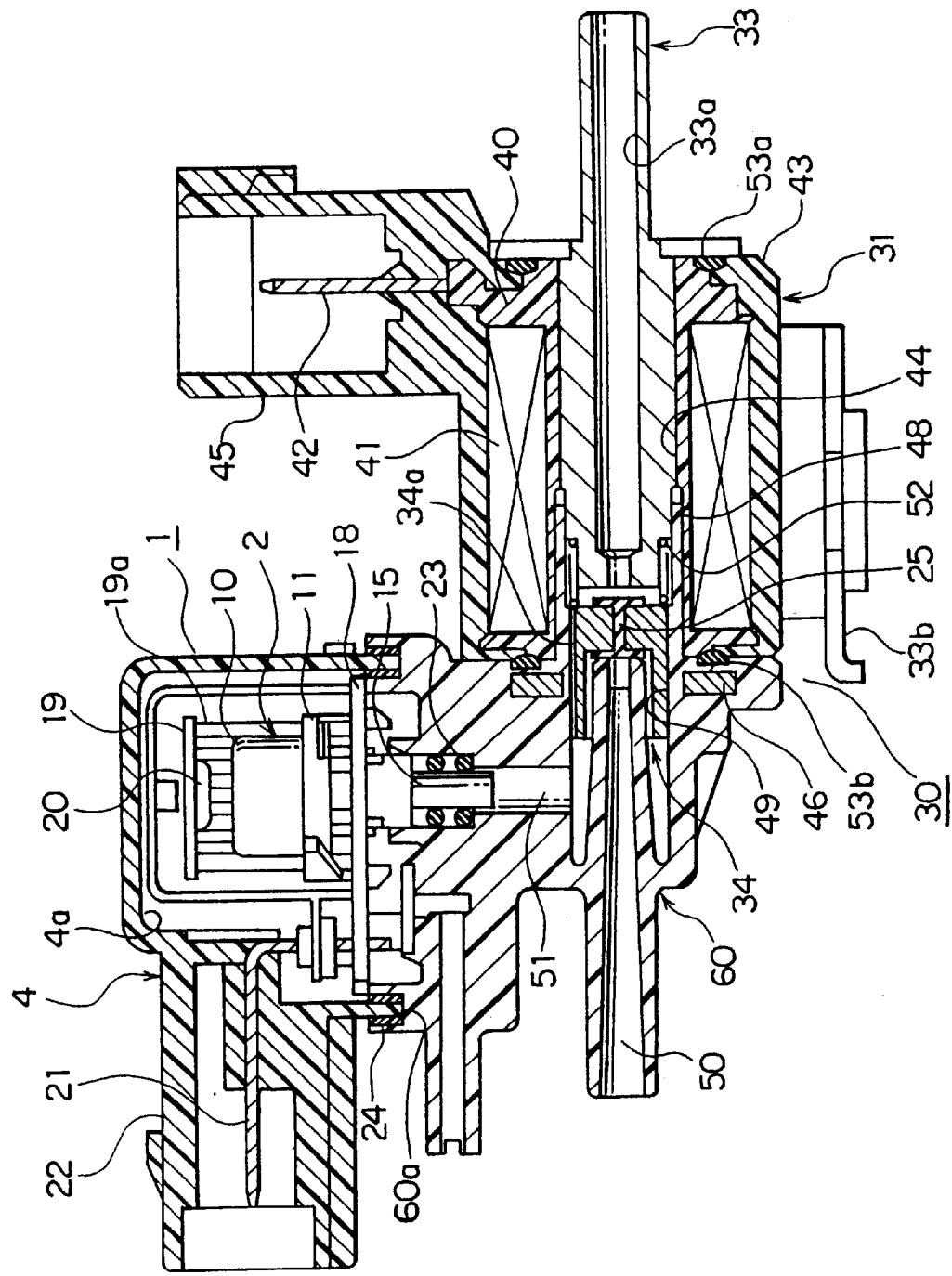
FIG. 2 is a sectional view showing the pressure detecting apparatus of embodiment 2 of the present invention.

FIG. 2 is a sectional view showing the pressure detecting apparatus of embodiment 2 of the present invention.

In FIG. 2, a port portion 60 is constituted by insert-molding an iron ring 46 therein. Moreover, though not illustrated, a part of the ring 46 is protruded from port portion 60. A fitting groove 60a to which an end of a cap 4 of a pressure sensor unit 1 is fitted is formed on the entire margin of one side of the port portion 60. Moreover, a cylindrical fitting protrusion 48 to be fitted into a core inserting hole 44 is protruded from a side wall surface perpendicular to a plane on which a fitting groove 60a is formed. Furthermore, a plunger storing portion 49 with a circular cross section for storing a plunger 34 is provided for the center of the fitting protrusion 48. Furthermore, an intake channel 50 for taking in the first measurement fluid is provided so as to face the plunger storing portion 49 from the side wall facing the side wall for which the fitting protrusion 48 is provided and a discharge channel 51 for discharging the taken-in measurement fluid is provided from one side wall so as to face the plunger storing portion 49. In this case, the exit side of the discharge channel 51 is flared so that a nipple 15 can be inserted.

Thus, in the case of the embodiment 2, the port portion 60 of a solenoid valve unit 30 is constituted so as to also function as the base of the pressure sensor unit 1.

Other structures of the embodiment 2 are the same as those of the embodiment 1.

To assemble a pressure detecting apparatus thus constituted, a core 33 is first fitted into the core inserting hole 44 of a coil body 31 from one end side of the coil body 31 and an O ring 53a is set between the core 33 and the coil body 31. Then, a spring 52 is inserted into the core inserting hole 44 from the other end side of the coil body 31. Then, the port portion 60 storing the plunger 34 in the plunger storing portion 49 is brought into contact with the coil body 31 by inserting the fitting protrusion 48 of the portion 60 into the core inserting hole 44. In this case, an O ring 53b is set between the coil body 31 and the port portion 32. Therefore, the protruded portion of the ring 46 is caulked and secured to an extended portion 33b of the core 33 and thus, the solenoid valve unit 30 is assembled. The airtightness of the solenoid valve unit 30 is secured by the O rings 53a and 53b compressed due to the caulking force of the protruded portion of the ring 46.

Then, the nipple 15 in which an O ring 23 is set is press-fitted to the exit side of the discharge channel 51 and an end of the cap 4 is fitted into the fitting groove 60a. Thereafter, an adhesive 24 is injected into the fitting groove 60a and the adhesive 24 is cured and thus, a pressure detecting apparatus is assembled.

In the case of this pressure detecting apparatus, the pressure sensor unit 1 and the solenoid valve unit 30 are connected to each other by the adhesive 24 in an airtight manner and integrated into one body and the discharge channel 51 of the port portion 60 is connected to the nipple 15 of a pressure sensor 2.

Also in the case of the pressure detecting apparatus of the embodiment 2, it is possible to alternately measure the pressure of the first measurement fluid introduced though the intake channel 50 and the pressure of the second measurement fluid introduced through the central hole 33a of the core 33 by switching the magnetized and unmagnetized states of the coil 41.

According to the embodiment 2, because the base of the pressure sensor unit 1 and the port portion of the solenoid valve unit 30 are constituted with one resin mold, the number of parts is decreased, the cost is reduced, and the assembling characteristic is improved.

Moreover, the connection between the base 3 and the port portion 32 which is necessary for the embodiment 1 is unnecessary and the leakage of measurement fluid at a joint is reduced and thereby, the measurement accuracy is improved.

Embodiment 3

Figure 3:
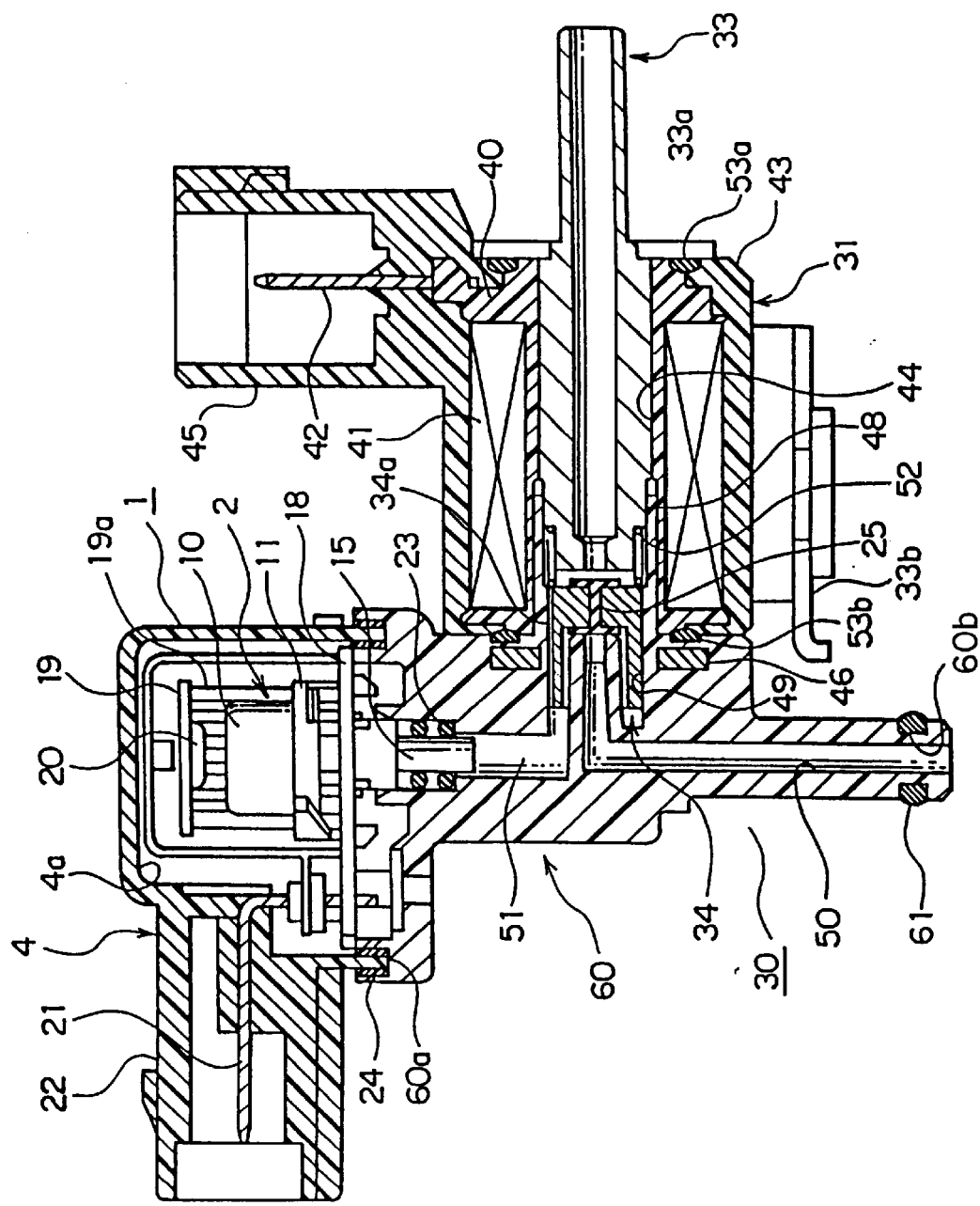
FIG. 3 is a sectional view showing the pressure detecting apparatus of embodiment 3 of the present invention.

In the case of the embodiment 3, a concave groove 60a is provided for the outer wall surface at an end of the entrance side of an intake channel 50 of a port portion 60 in the circumferential direction and an O ring 61 is set to the concave groove 60b, as shown in FIG. 3.

Other structures are the same as those of the embodiment 2.

In the case of the embodiment 3, it is possible to introduce the first measurement fluid from an object through the intake channel 50 by press-fitting the port portion 60 into the ejection port of an object for pressure detection. Therefore, the object is easily connected with a solenoid valve unit 30 without using any special connection member and thus, the cost is reduced.

In the case of the embodiment 3, an O ring is set to the outer boundary of the port forming the intake channel 50. However, it is also possible to set the O ring to the outer boundary of a core 33 or set the O ring to both the outer boundary of the port forming the intake channel 50 and the outer boundary of the core 33.

Embodiment 4

Figure 4:
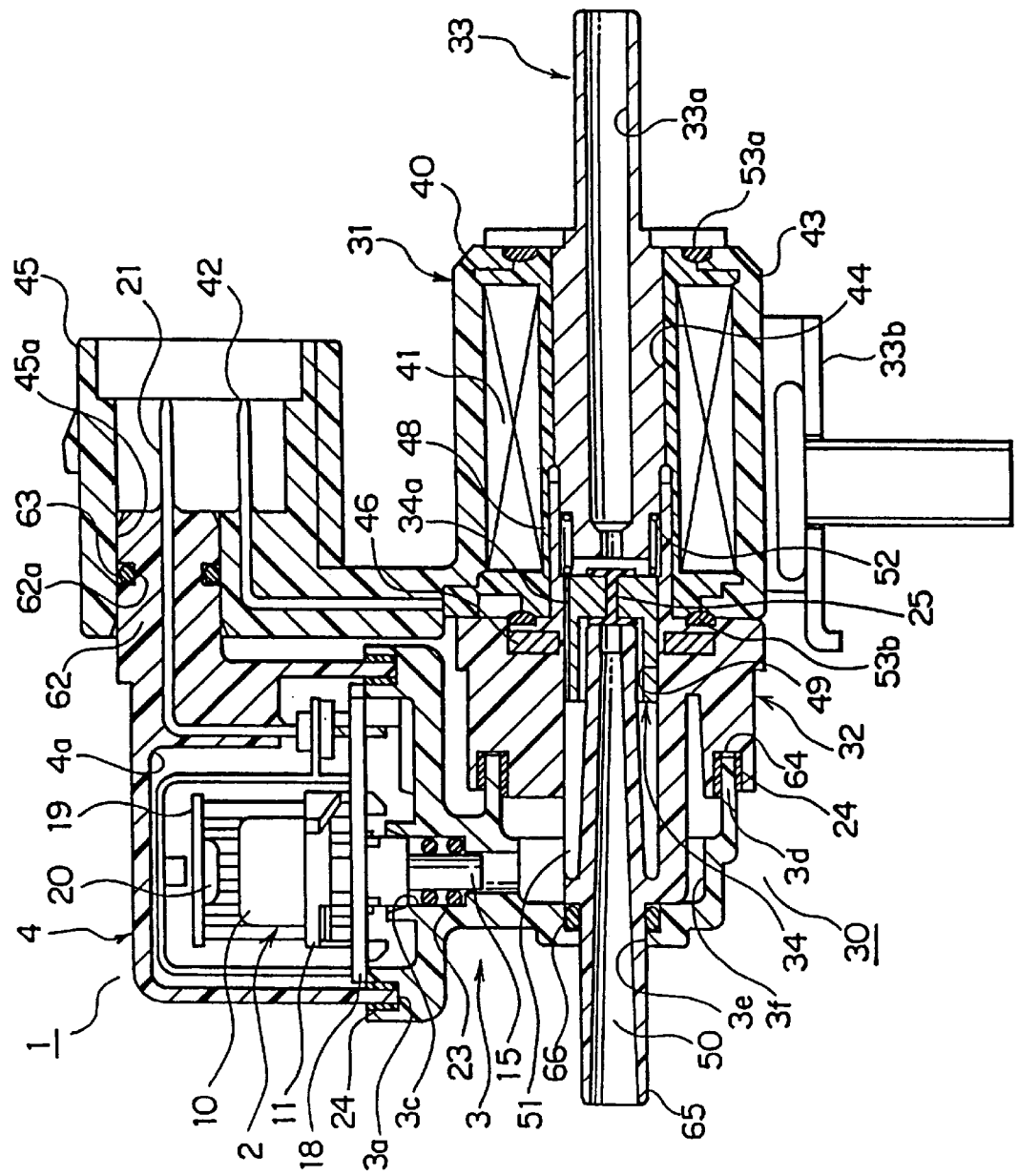
FIG. 4 is a sectional view showing the pressure detecting apparatus of embodiment 4 of the present invention.

FIG. 4 is a sectional view showing the pressure detecting apparatus of the embodiment 4 of the present invention.

In FIG. 4, a cap 4 is injection-molded by injecting resin into a die in which a terminal 21 is set and provided with a storing portion 4a for a pressure sensor 2 and a terminal holding portion 62. The terminal holding portion 62 is extended to one side of the storing portion 4a in the direction perpendicular to the opening direction of the storing portion 4a and provided with a concave groove 62a for setting an O ring 63 to the outer wall surface of the portion 62.

A base 3 is made of resin and a fitting groove 3a is provided for the entire margin of one side. Moreover, a storing portion 3f opening on one side of the base 3 is provided for the base 3 and an engaging protrusion 3d is protruded on the entire margin of the opening of the storing portion 3f. Furthermore, a through-hole 3c is provided for the base 3 from one side so as to reach the storing portion 3f and a through-hole 3e is provided for the bottom of the storing portion 3f.

A pressure sensor 2 is mounted by soldering an end of each electrode terminal 16, not shown, protruded from a pedestal 11 to a circuit board 18 and a ceramic substrate 19 is set to the circuit board 18 so as to cover the pressure sensor 2. Then, the cap 4 is put on the circuit board 18 so as to store the pressure sensor 2 in the storing portion 4a and each end of the terminals 21 is soldered to the circuit board 18. Moreover, the margin of the cap 4 is fitted into the fitting groove 3a while press-fitting a nipple 15 in which an O ring 23 is set into the through-hole 3c. Thereafter, an adhesive 24 is injected into the fitting groove 3a and a pressure sensor unit 1 is assembled by curing the adhesive 24. The airtightness of the pressure sensor unit 1 is secured by the O ring 23 and the adhesive 24. Moreover, the extending direction of the terminal holding portion 62 coincides with that of the engaging protrusion 3d of the base 3.

A coil body 31 is constituted by insert-molding a bobbin 40, a coil 41 wound on the bobbin 40, and a terminal 42 electrically connected to the coil 41 in a case 43. That is, the coil body 31 is injection-molded by setting an assembly constituted by winding the coil 41 on the bobbin 40 and electrically connecting the terminal 42 to the coil 41 in a die and injecting resin into the die. Moreover, in the case of the coil body 31, a core inserting hole 44 is formed at the axis center of the coil 41. Furthermore, a connector 45 is set closely to the coil 41 in a row and provided with a through-hole 45a serving as a terminal holding portion inserting hole for inserting the terminal holding portion 62.

A port portion 32 is constituted by insert-molding an iron ring 46 into the portion 32. Moreover, though not illustrated, a part of the ring 46 is protruded from the port portion 32. A fitting groove 64 to which the fitting protrusion 3d of the base 3 is fitted is formed on one side of the port portion 32 and a cylindrical fitting protrusion 48 to be fitted into the core inserting hole 44 is protruded to the other side. Moreover, a plunger storing portion 49 with a circular cross section for storing a plunger 34 is provided for the center of the cylindrical fitting protrusion 48. Furthermore, a port 65 is protruded from one side coaxially with the plunger storing portion 49. A intake channel 50 is provided for the port 65 so as to communicate the plunger storing portion 49 with the environment outside the intake channel 50 and a discharge channel 51 is provided from one side wall so as to face the plunger storing portion 49.

Furthermore, a core 33 is fitted into the core inserting hole 44 of the coil body 31 from one end side of the coil body 31 and an O ring 53a is set between the core 33 and the coil body 31. Furthermore, a spring 52 is inserted into the core inserting hole 44 from the other end side of the coil body 31.

Then, the port portion 32 storing the plunger 34 in the plunger storing portion 49 is brought into contact with the coil body 31 by inserting the fitting protrusion 48 of the portion 32 into the core inserting hole 44. In this case, an O ring 53b is set between the coil body 31 and the port portion 32. Therefore, the protruded portion of the ring 46 is caulked and secured to the extended portion 33b of the core 33 and thus, a solenoid valve unit 30 is assembled.

In the case of the pressure sensor unit 1 and the solenoid valve unit 30 thus assembled, port 65 is inserted into the through-hole 3e of the base 3, the terminal holding portion 62 is press-fitted into the through-hole 45a, and moreover the fitting protrusion 3d of the base 3 is fitted into the fitting groove 64 of the port portion 32. Moreover, the adhesive 24 is injected into the fitting groove 64 and the adhesive 24 is cured and integrated into one body to obtain a pressure detecting apparatus. In the case of this pressure detecting apparatus, an O ring 66 is set between the port 65 and the base 3 and compressed due to the pressure of the adhesive 24 at the time of junction and thus, the pressure sensor unit 1 and the solenoid valve unit 30 are connected in an airtight manner. Moreover, the discharge channel 51 of the port portion 32 is connected to the nipple 15 of the pressure sensor 2.

The embodiment 4 is constituted so that the terminal holding portion 62 of the pressure sensor unit 1 is inserted into the connector portion 45 of the solenoid valve unit 30. Therefore, only a pair of connectors are used at the chassis harness side, the connecting operation is simplified, confirmation of functions of the pressure sensor unit 1 and electrical checkout of the solenoid valve unit 30 are performed in the assembling process, and the yield is improved.

In the case of the embodiment 4, the base 3 and the port portion 32 are constituted with a different resin mold. However, similarly to the case of the embodiment 2, it is possible to constitute the base 3 and the port portion 32 with one resin mold.

Embodiment 5

Figure 5:
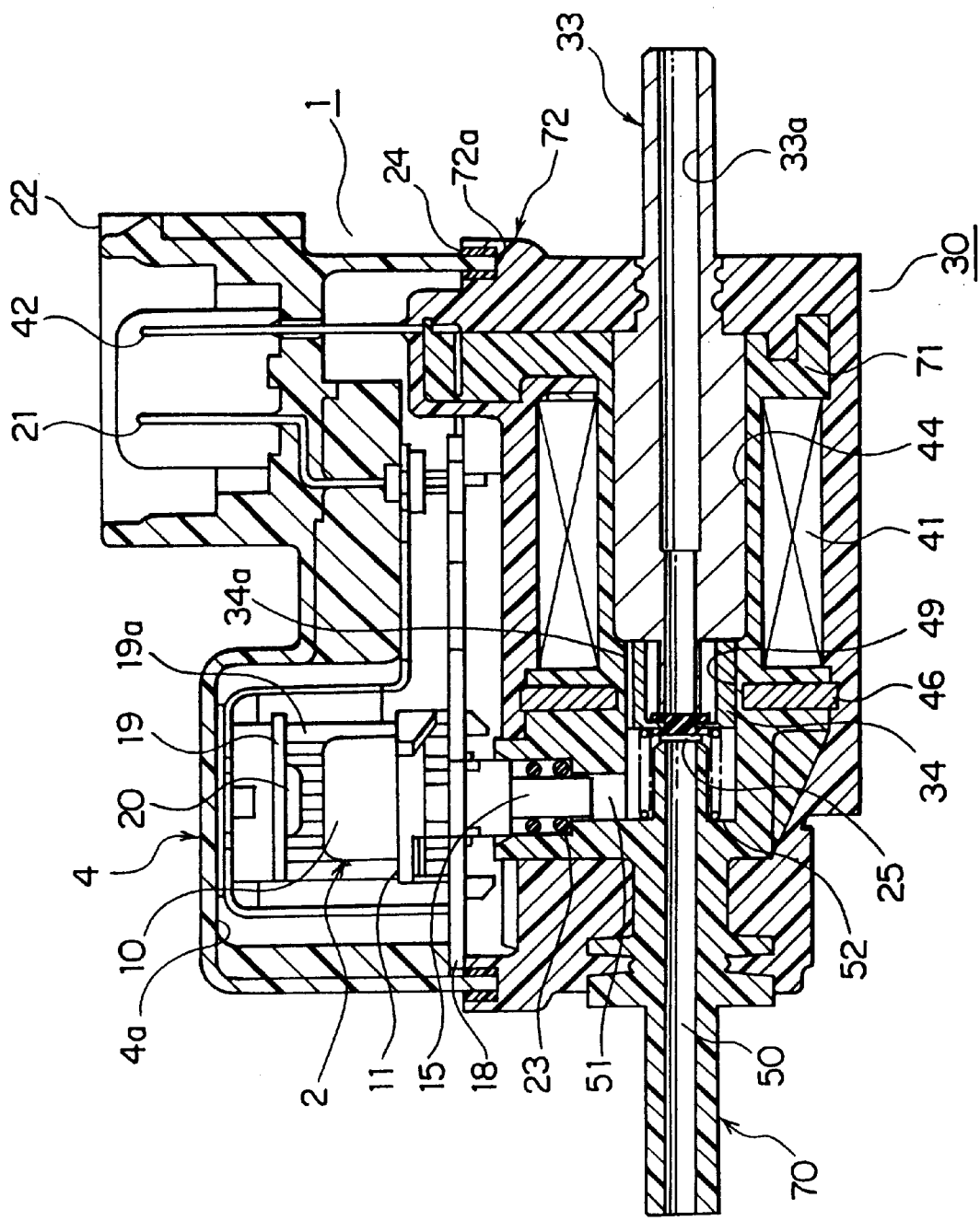
FIG. 5 is a sectional view showing the pressure detecting apparatus of embodiment 5 of the present invention.
Figure 6:
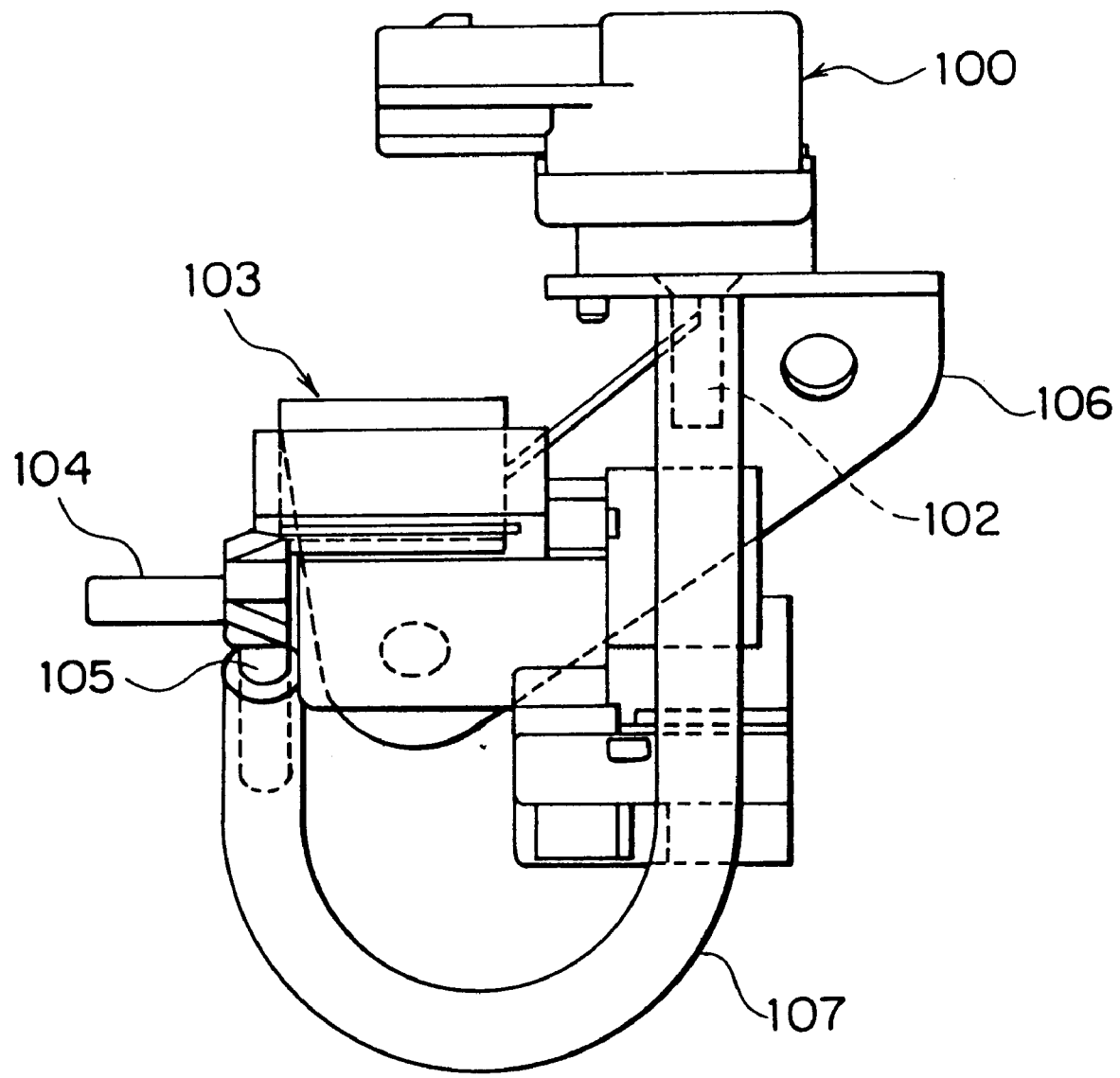
FIG. 6 is a block diagram showing a conventional pressure detecting apparatus.

FIG. 5 is a sectional view showing the pressure detecting apparatus of the embodiment 5 of the present invention.

In FIG. 5, a cap 4 is injection-molded by injecting resin into a die in which a terminal 21 is set and provided with a storing portion 4a for a pressure sensor 2 and a connector portion 22. The connector portion 22 is provided for one side of the storing portion 4a so as to turn openings of the connection portion 22 and the storing portion 4a in the direction opposite to each other.

A pressure sensor 2 is mounted by soldering each end of electrode terminals 16 protruded from a pedestal 11 to a circuit board 18 and moreover, a ceramic substrate 19 is set to the circuit board 18 so as to cover the pressure sensor 2. Moreover, a pressure sensor unit 1 is constituted by putting the cap 4 on the circuit board 18 so that the pressure sensor 2 is stored in the storing portion 4a and soldering each end of the terminals 21 to the circuit board 18.

A resin mold 70 is formed by integrating a bobbin and a port portion into one body. An iron ring 46 is insert-molded in the resin mold 70. Moreover, in the case of the resin mold 70, a core inserting hole 44 is provided from one side thereof, a plunger storing portion 49 is provided for the bottom of the core inserting hole 44 so as to communicate with the core inserting hole 44, a first intake channel 50 for introducing the first measurement fluid is provided from the other side thereof so as to communicate the plunger storing portion 49 with an environment outside the first intake channel 50, and a discharge channel 51 is provided from the top thereof so as to communicate the plunger storing portion 49 with measurement fluid introduction chamber, not shown. Furthermore, a coil winding frame 71 is provided for the outer boundary of the core inserting hole 44 coaxially with the core inserting hole 44. Moreover, the exit side of the discharge channel 51 is flared.

Furthermore, a coil 41 is wound on the coil winding frame 71, a spring 52 and a plunger 34 are inserted into the plunger storing portion 49 through the core inserting hole 44, and a core 33 is inserted into the core inserting hole 44. Furthermore, the terminal 42 is electrically connected to the coil 41. A solenoid valve unit 30 is injection-molded by setting the above assembly in a die and injecting resin into the die. That is, the solenoid valve unit 30 is constituted integrally with a case 72 by insert-molding the resin mold 70, coil 41, terminal 42, and core 33 in the case 72. Moreover, a fitting groove 72a serving as an engaging portion is provided near the periphery of the top of the case 72. Furthermore, the terminal 42 is extended upward from the case 72.

The pressure sensor unit 1 and the solenoid valve unit 30 thus assembled are integrated into one body by press-fitting the nipple 15 with an O ring 23 set to it to the exit side of the discharge channel 51, fitting an end of the cap 4 into the fitting groove 72a of the case 72, injecting an adhesive 24 into the fitting groove 72a, and curing the adhesive 24. In this case, the terminal 42 is outserted to the connector portion 22 and the terminals 21 and 42 are constituted with one connector.

In the case of the pressure detecting apparatus thus obtained, the pressure sensor unit 1 and the solenoid valve unit 30 are connected each other by the adhesive 24 in an airtight manner, the discharge channel 51 is connected to the nipple 15 of the pressure sensor 2 by the O ring 23 in an airtight manner.

Also in the case of the pressure detecting apparatus of the embodiment 5, it is possible to alternately measure the pressure of the first measurement fluid introduced through the intake channel 50 and the pressure of the second measurement fluid introduced through the central hole 33a of the core 33 by switching the magnetized state and the unmagnetized state of the coil 41.

According to the embodiment 5, because a port portion and a bobbin are integrally formed on the resin mold 70, no measurement fluid leaks, the measurement accuracy is improved, the number of parts is decreased, the cost is reduced, and the assembling characteristic is improved.

Moreover, because the solenoid valve unit 30 is constituted by insert-molding each component in the case 72, preferable airtightness is secured and it is possible to prevent water from coming from the outside.

Furthermore, because the pressure sensor unit 1 is directly joined to the case 72 of the solenoid valve unit 30, no base is necessary, the number of parts is decreased, the cost is reduced, and the assembling characteristic is improved. Furthermore, the junction between the base 3 and port portion 32 necessary for the embodiment 1 is unnecessary, leakage of measurement fluid at a joint is reduced, and thereby, the measurement accuracy is improved.

Furthermore, because the terminals 21 and 42 are constituted with one connector, only a pair of connectors are used at the chassis harness side, the connecting operation is simplified, confirmation of functions of the pressure sensor unit 1 and electrical checkout of the solenoid valve unit 30 are performed in the assembling process, and the yield is improved.

In the case of the above embodiments 1 to 4, a port potion and a bobbin are constituted with resin molds different from each other. However, it is possible to constitute the port portion and the bobbin with one resin mold similarly to the case of the embodiment 5.

Because the present invention is constituted as described above, it has the following advantages.

According to the present invention, a pressure sensor unit including a pressure sensor in which a semiconductor pressure-detecting device is set so as to partition a sensor vessel into a reference pressure chamber and a measurement fluid introduction chamber and moreover in which a nipple is set so as to communicate the measurement fluid introduction chamber with the discharge side of the port portion, wherein the semiconductor pressure-detecting device has a diaphragm portion formed by decreasing a part of a substrate thereof in thickness and a bridge circuit constituted by forming gauge resistances around the diaphragm portion; a circuit board on which an electronic circuit for amplifying and correcting an electrical signal of the semiconductor pressure-detecting device and the pressure sensor are mounted; a base made of resin which has a through-hole, on which the circuit board is mounted, and in which the nipple is provided with an O ring and press-fitted into the through-hole; and a cap made of resin in which a pressure-sensor-side terminal is insert-molded and a pressure-sensor storing portion is formed and which is set to the base so as to store the pressure sensor in the pressure sensor storing portion; and a solenoid valve unit including a coil body in which a coil wound on a bobbin and a solenoid-valve-side terminal electrically connected to the coil are insert-molded in a case made of resin and a core inserting hole is formed at the axis center of the coil; a port portion made of resin in which a plunger storing portion with an opening at one end, a first intake channel for communicating the plunger storing portion with an environment outside of the first intake channel which introduces a first measurement fluid, and a discharge channel for communicating the plunger storing portion with the measurement fluid introduction chamber are provided and which is connected to the coil body so that the opening of the plunger storing portion faces the core inserting hole; a core which is inserted into the core inserting hole of the coil body and in which a second intake channel for introducing second measurement fluid is provided for the axis center of the core so as to communicate the plunger storing portion with an environment external to the second intake channel; a plunger which is stored in the plunger storing portion and reciprocated in the plunger storing portion due to the magnetic attraction of the coil; and a valve element set to the plunger to block either of the first intake channel and the second intake channel in accordance with the reciprocation of the plunger are used, and the pressure sensor unit and the solenoid unit are integrated into one body by joining the base with the port portion so that the through-hole of the base communicates with the discharge channel of the port portion. Therefore, no bracket or hose is necessary, downsizing is realized, and a pressure detecting apparatus requiring less setting space is obtained. Moreover, because a base and a port portion are joined each other by resins, a large joining strength is obtained and a complete airtightness is obtained.

Furthermore, because the pressure sensor unit and the solenoid valve unit are integrated into one body so as to align the axis center of the nipple and that of the core, the loss of introduced pressure is reduced and the responding characteristic is improved.

Furthermore, because the base and the bobbin are constituted with one resin mold, the number of parts is decreased, the cost is reduced, the assembling characteristic is improved, leakage of measurement fluid at a joint is reduced, and thereby the measurement accuracy is improved.

Furthermore, because the port portion and the bobbin are constituted with one resin mold, the number of parts is decreased, the cost is reduced, the assembling characteristic is improved, leakage of measurement fluid at a joint is reduced, and thereby the measurement accuracy is improved.

Furthermore, according to the present invention, a pressure sensor unit including a pressure sensor in which a semiconductor pressure-detecting device is set so as to partition a sensor vessel into a reference pressure chamber and a measurement fluid introduction chamber and moreover in which a nipple is set so as to communicate the measurement fluid introduction chamber with discharge channel of the port portion, wherein the semiconductor pressure-detecting device has a diaphragm portion formed by decreasing a part of a substrate thereof in thickness and a bridge circuit constituted by forming gauge resistances around the diaphragm portion; a circuit board on which an electronic circuit for amplifying and correcting an electrical signal of the semiconductor pressure-detecting device and the pressure sensor are mounted; and a cap made of resin in which a pressure-sensor-side terminal is insert-molded and a pressure-sensor storing portion is formed and which the pressure sensor is stored in the pressure sensor storing portion; and a solenoid valve unit including a resin mold in which a core inserting hole is formed from one side, a plunger storing portion is provided for the bottom of the core inserting hole, a first intake channel for introducing first measurement fluid is provided from the other side so as to communicate the plunger storing portion with an environment external to the first intake channel, a discharge channel is provided at the top of the plunger storing portion so as to communicate the plunger storing portion with the measurement fluid introduction chamber, and a coil winding frame is coaxially provided for the outer boundary of the coil inserting hole; a coil wound on the coil winding frame; a solenoid-valve-side terminal electrically connected to the coil, a core which is inserted into the core inserting hole of the resin mold and in which a second intake channel for introducing second measurement fluid is provided at the axis center so as to communicate the plunger storing portion with an environment external to the second intake channel; a plunger which is stored in the plunger storing portion and reciprocated in the plunger storing portion due to the magnetic attraction of the coil; a valve element set to the plunger to block either of the first intake channel and the second intake channel in accordance with the reciprocation of the plunger; and a case made of resin in which the resin mold, the coil, the solenoid-valve-side terminal, and the core are insert-molded and an engaging portion is provided for the entire upside margin; wherein the nipple is provided with an O ring and press-fitted into the discharge channel, the cap is engaged with the engaging portion of the case, the cap is joined with the engaging portion of the case, and the pressure sensor unit and the solenoid valve unit are integrated into one body. Therefore, a bracket and a hose are unnecessary, downsizing is realized, and a pressure detecting apparatus requiring less setting space is obtained. Moreover, a solenoid valve unit is constituted with an integrated body, the assembling characteristic is improved and a complete airtightness is obtained.

Moreover, because an O ring is set to the outer boundary of at least either of ports forming the first intake channel and the second intake channel, an object and a solenoid valve unit can be connected each other without using any special connection member.

Furthermore, because the pressure-sensor terminal and the solenoid-valve terminal are constituted with the same connector, only one pair of connectors of an external harness are used and therefore, the connecting action is simplified.

Furthermore, because the connector is constituted by providing a terminal holding portion in which the pressure-sensor terminal is insert-molded for the cap, providing a connector portion in which the solenoid-valve terminal is insert-molded for the case of the coil body, and providing a terminal-holding-portion inserting hole for inserting the terminal holding portion for the connector portion, and inserting the terminal holding portion into the terminal-holding-portion inserting hole, confirmation of functions of a pressure sensor unit and electrical checkout of a solenoid valve unit are performed in the assembling process, and the yield is improved.

Furthermore, because the connector is constituted by providing a connector portion in which the pressure-sensor terminal is insert-molded for the cap and outserting the extended portion of the solenoid-valve terminal insert-molded in the case of the coil body to the connector portion, confirmation of functions of a pressure sensor unit and electrical checkout of a solenoid valve unit are performed in the assembling process and the yield is improved.

What is claimed is:

1. A pressure detecting apparatus comprising:
    a pressure sensor unit including a pressure sensor, a semiconductor pressure-detecting device set in said pressure sensor so as to partition a sensor vessel into a reference pressure chamber and a measurement fluid introduction chamber, a nipple set so as to communicate said measurement fluid introduction chamber with a discharge channel, wherein said semiconductor pressure-detecting device has a diaphragm portion comprised of a thin substrate and a bridge circuit comprised of gauge resistances formed around said diaphragm portion; a circuit board on which an electronic circuit for amplifying and correcting an output signal of said semiconductor pressure-detecting device and said pressure sensor are mounted; a base which has a through-hole, on which said circuit board is mounted, and in which said nipple is provided with an O ring and press-fitted into said through-hole; and a cap attached to said base, said cap incorporating a pressure-sensor-side terminal and defining a pressure-sensor storing portion; and
    a solenoid valve unit including a coil body, a coil wound on a bobbin, and a solenoid-valve-side terminal electrically connected to said coil, wherein a core inserting hole is formed at a center axis of said coil; a port portion connected to said coil body comprised of a plunger storing portion with an opening facing faces said core insert hole, a first intake channel for communicating said plunger storing portion with an environment outside of said first intake channel and introducing first measurement fluid, and said discharge channel for communicating said plunger storing portion with said measurement fluid introduction chamber; a core said core housed within said core inserting hole of said coil body and said core including a second intake channel for introducing second measurement fluid at said center axis of said core so as to communicate said plunger storing portion with an environment outside of said second intake channel; a plunger stored in said plunger storing portion and reciprocated in said plunger storing portion due to a magnetic attraction of said coil; and a valve element set to said plunger to block one of said first intake channel and said second intake channel in accordance with a predefined movement of said plunger; wherein
    said pressure sensor unit and said solenoid unit are integrated into one body by joining said base with said port portion so that said through-hole of said base communicates with said discharge channel of said port portion.

2. A pressure detecting apparatus according to claim 1, wherein said pressure sensor unit and said solenoid valve unit are integrated into one body so that a center axis of said nipple is aligned with said center axis of said core.

3. A pressure detecting apparatus according to claim 1, wherein said base and said port portion are constituted with one resin mold.

4. A pressure detecting apparatus according to claim 1, wherein said port portion and said bobbin are constituted with one resin mold.

5. A pressure detecting apparatus according to claim 1, wherein an O ring is set to an outer boundary of at least one of ports forming said first intake channel and said second intake channel.

6. A pressure detecting apparatus according to claim 1, wherein said pressure-sensor terminal and said solenoid-valve terminal are constituted within a single connector.

7. A pressure detecting apparatus according to claim 6, wherein said connector is constituted by providing a terminal holding portion in which said pressure-sensor terminal is insert-molded for said cap, providing a connector portion in which said solenoid-valve terminal is insert-molded for said coil body, providing a terminal-holding-portion inserting hole for inserting said terminal holding portion for said connector portion, and inserting said terminal holding portion into said terminal-holding-portion inserting hole.

8. A pressure detecting apparatus according to claim 6, wherein said connector is constituted by providing a connector portion in which said pressure-sensor terminal is insert-molded for said cap and outserting a portion of said solenoid-valve terminal insert-molded in the case of said coil body to said connector portion.

9. A pressure detecting apparatus comprising:
    a pressure sensor unit including a pressure sensor, a semiconductor pressure-detecting device set in said pressure sensor so as to partition a sensor vessel into a reference pressure chamber and a measurement fluid introduction chamber, a nipple set so as to communicate said measurement fluid introduction chamber with a discharge channel, wherein said semiconductor pressure-detecting device has a diaphragm portion comprised of a thin substrate and a bridge circuit comprised of gauge resistances formed around said diaphragm portion; a circuit board on which an electronic circuit for amplifying and correcting an output signal of said semiconductor pressure-detecting device and said pressure sensor are mounted; and a cap attached to said base, said cap incorporating a pressure-sensor-side terminal and defining a pressure-sensor storing portion; and
    a solenoid valve unit including a core inserting hole formed within one side of said solenoid valve unit, a plunger storing portion provided within said core inserting hole and a coil winding frame coaxially provided around said core inserting hole, said plunger storing portion including a first intake channel for introducing a first measurement fluid provided from another side so as to communicate said plunger storing portion with an environment outside of said first intake channel, a discharge channel provided so as to communicate said plunger storing portion with said measurement fluid introduction chamber; a coil wound on said coil winding frame; a solenoid-valve-side terminal electrically connected to said coil, a core insertably provided within said core inserting hole, said core including a second intake channel in communication with an environment outside of said second intake channel, containing a second measurement fluid, and with said plunger storing portion; a plunger stored in said plunger storing portion and reciprocated in said plunger storing portion due to a magnetic attraction of said coil; a valve element set to said plunger to block one of said first intake channel and said second intake channel in accordance with a predefined movement of said plunger; and a case including said coil, said solenoid-valve-side terminal, and said core, said engaging portion provided at a periphery of a top of said case; wherein said nipple is provided with an O ring and press-fitted into said discharge channel, said cap is engaged with said engaging portion of said case, said cap is joined with said engaging portion of said case, and said pressure sensor unit and said solenoid valve unit are integrated into one body.

10. A pressure detecting apparatus according to claim 9, wherein an O ring is set to an outer boundary of at least one of ports forming said first intake channel and said second intake channel.

11. A pressure detecting apparatus according to claim 9, wherein said pressure-sensor terminal and said solenoid-valve terminal are within a single connector.

12. A pressure detecting apparatus according to claim 11, wherein said connector is constituted by providing a terminal holding portion in which said pressure-sensor terminal is insert-molded for said cap, providing a connector portion in which said solenoid-valve terminal is insert-molded for the case of said coil body, providing a terminal holding portion inserting hole for inserting said terminal holding portion for said connector portion, and inserting said terminal holding portion into said terminal-holding-portion inserting hole.

13. A pressure detecting apparatus according to claim 11, wherein said connector is constituted by providing a connector portion in which said pressure-sensor terminal is insert-molded for said cap and outserting a portion of said solenoid-valve terminal insert-molded in the case of said coil body to said connector portion.

14. A pressure detecting apparatus comprising:
a pressure sensor unit, said pressure sensor unit including a pressure-detecting device comprised of a measurement fluid introduction chamber;
a base portion, said base portion defining a through-hole to said measurement fluid introduction chamber;
a port portion, said port portion including a plunger storing portion, a plunger, and a discharge channel, said plunger storing portion defining a first opening to a first intake channel and defining a second opening to said discharge channel, said discharge channel communicating with said through-hole of said base portion; and
a solenoid valve unit, said solenoid valve unit comprised of a coil, a coil body, a terminal electrically connected to said coil, and a core,
wherein a spring is located between said core and said plunger, said spring having a spring force biasing said plunger toward said first opening,
wherein a magnetic field of said coil can move said plunger away from said first opening thereby allowing communication between said first intake channel, said plunger storing portion, and said discharge channel, and
wherein said pressure sensor unit and said solenoid valve unit are integrated into one body by joining said base portion with said port portion.

15. A pressure detecting apparatus as disclosed in claim 14, further comprising:
a second intake channel and a third opening in said plunger storing portion to said second intake channel;
wherein said plunger selectively enables communication between said plunger storing portion and one of said first intake channel and said second intake channel through said first opening and said third opening, respectively, in response to one of said spring force or said magnetic field.

16. A pressure detecting apparatus as disclosed in claim 14, wherein said pressure-detecting device is a semiconductor-pressure detecting device; said semiconductor pressure-detecting device having a diaphragm portion comprised of a thin substrate and a bridge circuit comprised of gauge resistances formed around said diaphragm portion.

17. A pressure detecting apparatus as disclosed in claim 16, further comprising a circuit board on which an electronic circuit for amplifying and correcting an output signal of said semiconductor pressure-detecting device and said pressure sensor are mounted, wherein said circuit board is mounted on said base.

18. A pressure detecting apparatus as disclosed in claim 15, wherein said solenoid valve unit comprises a coil body including a coil wound on a bobbin and a solenoid-valve-side terminal electrically connected to said coil insert molded in a case made of resin and a core inserting hole is formed at a center of said coil.

19. A pressure detecting apparatus according to claim 14, wherein said pressure-sensor unit includes a pressure-sensor terminal and a solenoid-valve terminal integrated within one connector.

20. A pressure detecting apparatus according to claim 18, further comprising:
a case made of resin, wherein said coil, said solenoid-valve-side terminal, and said second intake channel are insert-molded into said case;
an engaging portion provided at a periphery of a top of said case; and
a cap fixably engaged with said engaging portion of said case,
wherein said pressure sensor unit and said solenoid valve unit are integrated into one body.

* * * * *